(12) United States Patent
Taggart

(10) Patent No.: US 6,406,050 B1
(45) Date of Patent: Jun. 18, 2002

(54) MOTORCYCLE HITCH DEVICE

(76) Inventor: Steven P. Taggart, 113 Kathlyn La., Rowlett, TX (US) 75089

( * ) Notice: Subject to any disclaimer, the term of this patent is extended or adjusted under 35 U.S.C. 154(b) by 0 days.

(21) Appl. No.: 09/849,428

(22) Filed: May 4, 2001

(51) Int. Cl.[7] .................................................. B60D 1/48
(52) U.S. Cl. ...................................... 280/292; 280/495
(58) Field of Search ................................ 280/292, 291, 280/288.4, 402, 495, 204; 180/219; D12/114

(56) References Cited

U.S. PATENT DOCUMENTS

| | | | |
|---|---|---|---|
| 3,598,426 A | | 8/1971 | Spiese |
| 3,937,489 A | | 2/1976 | Hawes et al. |
| 3,993,321 A | | 11/1976 | Cote |
| D243,166 S | | 1/1977 | Jones |
| D273,486 S | | 4/1984 | O'rourke |
| 4,588,199 A | * | 5/1986 | Fisher ........................ 280/204 |
| D298,022 S | | 10/1988 | O'rourke |
| 6,305,702 B1 | * | 10/2001 | Alford, II ................... 280/204 |

FOREIGN PATENT DOCUMENTS

JP  9-193871  * 7/1997

* cited by examiner

Primary Examiner—Avraham Lerner

(57) ABSTRACT

A motorcycle hitch device for using a motorcycle to pull a trailer. The motorcycle hitch device includes a pair of brackets each attached to the bottom surface of the fender such that the brackets face each other. Each of a pair of saddles is attached to one of the brackets. A hitch portion comprises a plate having a top side and a bottom side. A ball hitch is attached to the top side of the plate. A pair of mountings removably couple the plate to the saddles. Each of the mountings comprising a bar attached to the bottom side of the plate, each of the bars is extendable into one of the saddles. Each of a pair of pins is extendable through one of the saddles and an associated bar for removably securing the bars to the saddles.

6 Claims, 2 Drawing Sheets

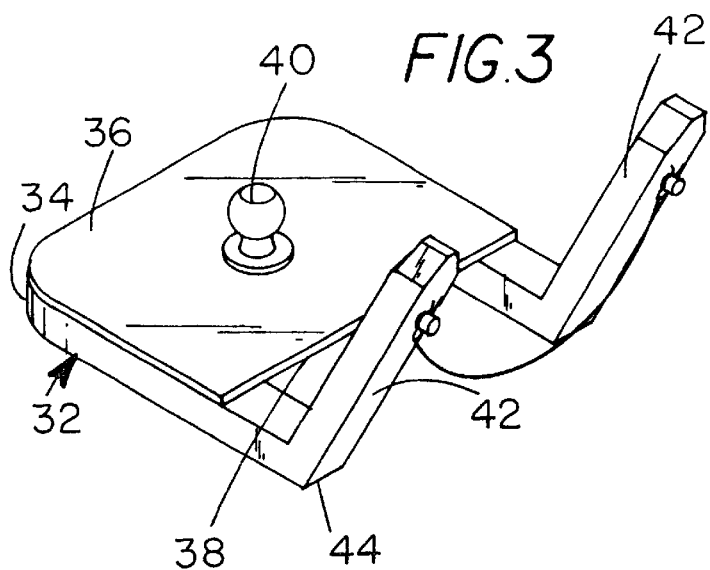
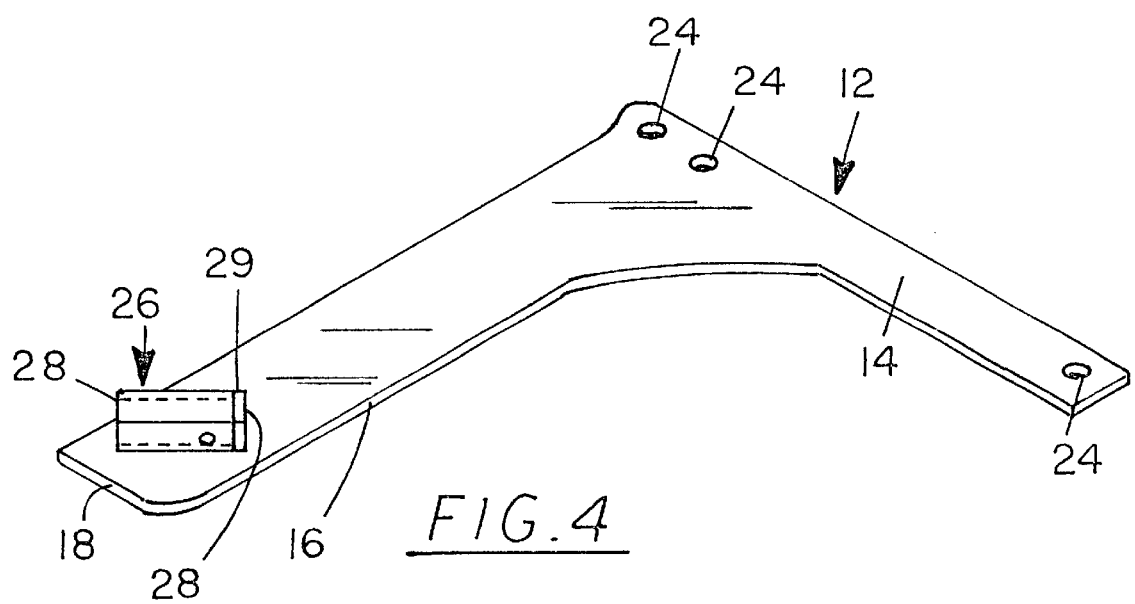

MOTORCYCLE HITCH DEVICE

BACKGROUND OF THE INVENTION

1. Field of the Invention

The present invention relates to hitch devices and more particularly pertains to a new motorcycle hitch device for using a motorcycle to pull a trailer.

2. Description of the Prior Art

The use of hitch devices is known in the prior art. More specifically, hitch devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 3,598,426; U.S. Des. Pat. No. 273,486; U.S. Des. Pat. No. 298,022; U.S. Des. Pat. No. 243,166; U.S. Pat. No. 3,937,489; and U.S. Pat. No. 3,993,321.

While these devices fulfill their respective, particular objectives and requirements, the aforementioned patents do not disclose a new motorcycle hitch device. The inventive device includes a pair of brackets each attached to the bottom surface of the fender such that the brackets face each other. Each of a pair of saddles is attached to one of the brackets. A hitch portion comprises a plate having a top side and a bottom side. A ball hitch is attached to the top side of the plate. A pair of mountings removably couple the plate to the saddles. Each of the mountings comprising a bar attached to the bottom side of the plate, each of the bars is extendable into one of the saddles. Each of a pair of pins is extendable through one of the saddles and an associated bar for removably securing the bars to the saddles.

In these respects, the motorcycle hitch device according to the present invention substantially departs from the conventional concepts and designs of the prior art, and in so doing provides an apparatus primarily developed for the purpose of using a motorcycle to pull a trailer.

SUMMARY OF THE INVENTION

In view of the foregoing disadvantages inherent in the known types of hitch devices now present in the prior art, the present invention provides a new motorcycle hitch device construction wherein the same can be utilized for using a motorcycle to pull a trailer.

The general purpose of the present invention, which will be described subsequently in greater detail, is to provide a new motorcycle hitch device apparatus and method which has many of the advantages of the hitch devices mentioned heretofore and many novel features that result in a new motorcycle hitch device which is not anticipated, rendered obvious, suggested, or even implied by any of the prior art hitch devices, either alone or in any combination thereof.

To attain this, the present invention generally comprises a pair of brackets each attached to the bottom surface of the fender such that the brackets face each other. Each of a pair of saddles is attached to one of the brackets. A hitch portion comprises a plate having a top side and a bottom side. A ball hitch is attached to the top side of the plate. A pair of mountings removably couple the plate to the saddles. Each of the mountings comprising a bar attached to the bottom side of the plate, each of the bars is extendable into one of the saddles. Each of a pair of pins is extendable through one of the saddles and an associated bar for removably securing the bars to the saddles.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new motorcycle hitch device apparatus and method which has many of the advantages of the hitch devices mentioned heretofore and many novel features that result in a new motorcycle hitch device which is not anticipated, rendered obvious, suggested, or even implied by any of the prior art hitch devices, either alone or in any combination thereof.

It is another object of the present invention to provide a new motorcycle hitch device which may be easily and efficiently manufactured and marketed.

It is a further object of the present invention to provide a new motorcycle hitch device which is of a durable and reliable construction.

An even further object of the present invention is to provide a new motorcycle hitch device which is susceptible of a low cost of manufacture with regard to both materials and labor, and which accordingly is then susceptible of low prices of sale to the consuming public, thereby making such motorcycle hitch device economically available to the buying public.

Still yet another object of the present invention is to provide a new motorcycle hitch device which provides in the apparatuses and methods of the prior art some of the advantages thereof, while simultaneously overcoming some of the disadvantages normally associated therewith.

Still another object of the present invention is to provide a new motorcycle hitch device for using a motorcycle to pull a trailer.

Yet another object of the present invention is to provide a new motorcycle hitch device which includes a pair of brackets each attached to the bottom surface of the fender such that the brackets face each other. Each of a pair of saddles is attached to one of the brackets. A hitch portion comprises a plate having a top side and a bottom side. A ball hitch is attached to the top side of the plate. A pair of mountings removably couple the plate to the saddles. Each of the mountings comprising a bar attached to the bottom side of the plate, each of the bars is extendable into one of the saddles. Each of a pair of pins is extendable through one of the saddles and an associated bar for removably securing the bars to the saddles.

Still yet another object of the present invention is to provide a new motorcycle hitch device that has a hitch portion which is removable from the motorcycle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a schematic perspective view of the hitch portion of the present invention.

FIG. 4 is a schematic perspective view of the bracket of the present invention.

DESCRIPTION OF THE PREFERRED EMBODIMENT

Figure 1:
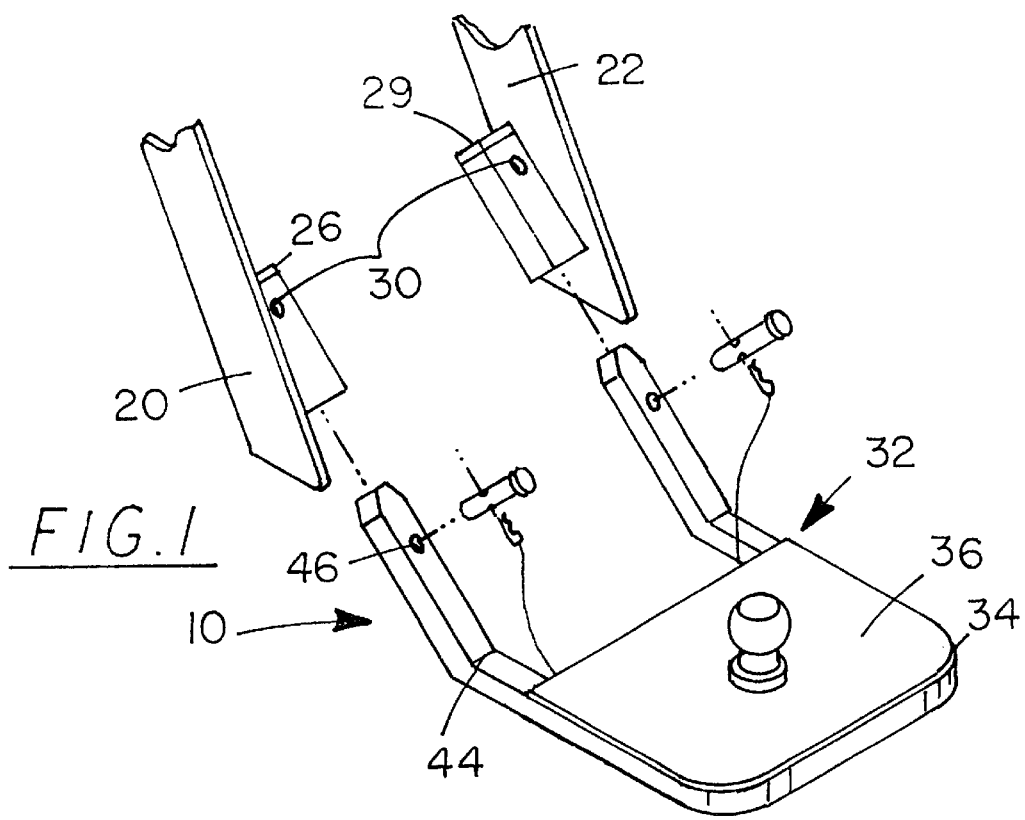
FIG. 1 is a schematic perspective view of a new motorcycle hitch device according to the present invention.
Figure 2:
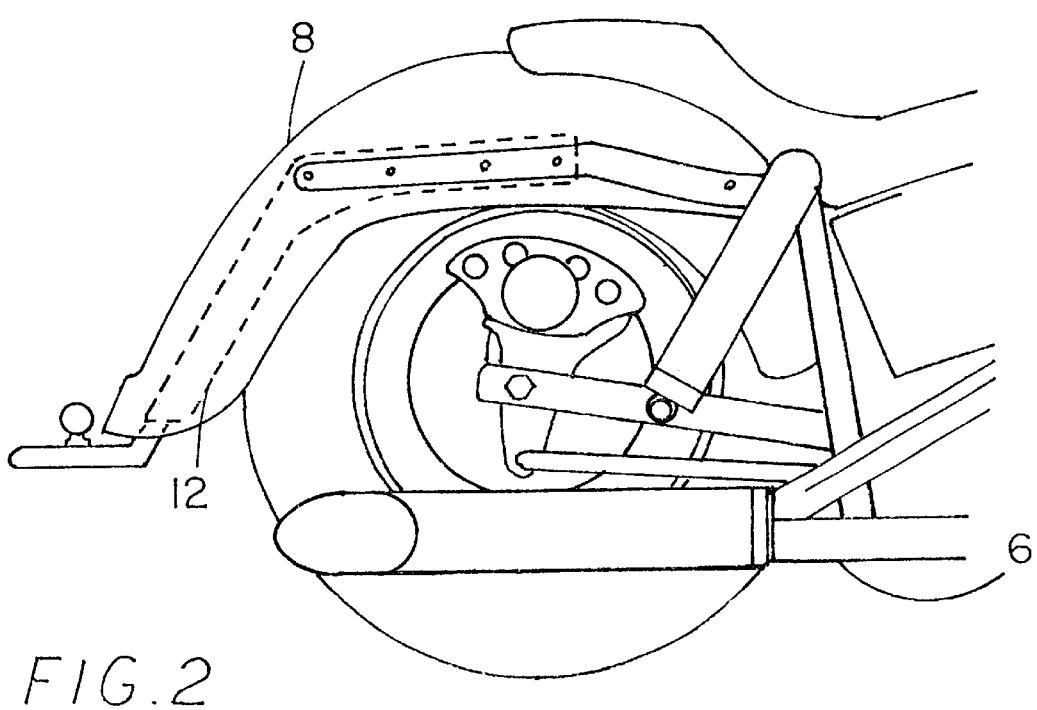
FIG. 2 is a schematic side view of the present invention.

With reference now to the drawings, and in particular to FIGS. 1 through 4 thereof, a new motorcycle hitch device embodying the principles and concepts of the present invention and generally designated by the reference numeral 10 will be described.

As best illustrated in FIGS. 1 through 4, the motorcycle hitch device 10 generally comprises a pair of brackets 12 each having a first portion 14 and a second portion 16 integrally connected to each other at their ends. The first 14 and second 16 portions are in an angular relationship to each other at an angle generally between 90 degrees and 135 degrees. Each of the brackets 12 has a first side 20 and a second side 22. Each of the first 20 and second 22 sides is generally planar. Each of the brackets 12 has a plurality of apertures 24 extending through the first 20 and second 22 sides. The first sides 20 are attached to a bottom surface of a conventional rear motorcycle fender 8 such that the second sides 22 are facing each other. This may be accomplished through fasteners through the apertures in the brackets or by welding the brackets to the fender 8. The first portions 14 are orientated generally horizontal such that the second portions 16 extend downwardly away from the motorcycle 6.

Each of a pair of saddles 26 is attached to one of the second sides 22 of the brackets 12. Each of the saddles 26 is generally adjacent to a free end 18 of the second portions 16. The saddles 26 each comprise a tube having a pair of open ends 28. An axis of the tubes, or saddles 26, extending through the open ends 28 is parallel with a respective a plane of the second side 22 of the brackets 12. The axis generally extends away from the second portion 16. Each of the tubes 26 has a hole 30 therein traversing the axis.

A hitch portion 32 comprises a plate 34 having a top side 36 and a bottom side 38, a ball hitch 40 attached to the top side 36 of the plate 34, and a pair of mountings 42 for removably coupling the plate 34 to the saddles 26. Each of the mountings 42 comprises a bar attached to the bottom side 38 of the plate 34. The bars, or mounting 42, are orientated parallel to each other and extend away from the plate 34. Each of the bars 42 has a bend 44 therein such that the bars 42 extend upwardly and outwardly from the plate 34. Each of the bars 42 is extendable into one of the saddles 26. The bends 44 have an angle such that the plate 34 is orientated generally horizontal when the bars 42 are extended into the saddles 26. The bars preferably may not extend beyond a stop plate 29 attached to an opposite end of the saddle 26 with respect to an entering end of the saddle 26. Each of the bars 42 has an aperture 46 therein positioned for alignment with one of the holes 30 in the tubes 26.

Each of a pair of pins 48 is extendable through one of the holes 30 in the tubes 26 and one of the apertures 46 in the bars 42 for securing the bars 42 to the saddles 26.

In use, the brackets are coupled to the fender for generally permanent installation. The hitch portion is removably attached tot the brackets when needed and removed when not in use. The hitch ball is used as a conventional hitch ball. The brackets may also be attached to the frame of the motorcycle and positioned under the fender so that the user may still remove the hitch portion so that no parts of the device are shown.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A motorcycle hitch device for attaching to a bottom surface of a rear fender of a motorcycle, said device comprising:
 a pair of brackets each attached to said bottom surface of said fender such that said brackets face each other;
 a pair of saddles, each of said saddles being attached to one of said brackets;
 a hitch portion comprising;
  a plate having a top side and a bottom side;
  a ball hitch being attached to said top side of said plate;
  a pair of mountings for removably coupling said plate to said saddles, each of said mountings comprising a bar attached to said bottom side of said plate, each of said bars being extendable into one of said saddles such that an edge of said plate adjacent a wheel of the motorcycle is positioned in spaced relationship to outwardly facing edges of said bars when said bars are positioned in said saddles for preventing contact between said edge of said plate adjacent the wheel of the motorcycle and the wheel of the motorcycle; and each of a pair of pins being extendable through one of said saddles and an associated bar for removably securing said bars to said saddles.

2. The motorcycle hitch device as in claim 1, wherein each of said brackets have a first portion and a second portion integrally connected to each other such that said first and second portions are in an angular relationship to each other at an angle generally between 90 degrees and 135 degrees, each of said brackets having a first side and a second side, each of said first and second sides being generally planar, each of said first sides being attached to said bottom surface of said fender such that said second sides are facing each other, said first portions being orientated generally horizontal such that said second portions are extending downwardly away from the motorcycle.

3. The motorcycle hitch device as in claim 2, wherein each of said saddles are generally adjacent to a free end of said second portions.

4. The motorcycle hitch device as in claim 1, wherein each of said saddles comprises a tube having a pair of open ends, each of said tubes having a hole therein traversing said axis for receiving said pins.

5. The motorcycle hitch device as in claim 4, wherein each of said bars are orientated parallel to each other and extending away from said plate, each of said bars having a bend therein such that said bars extend upwardly and outwardly from said plate, each of said bars being extendable into one of said saddles, said bends having an angle such that said plate is orientated generally horizontal when said bars are extended into said saddle, each of said bars having an aperture therein positioned for alignment with one of said holes in said tubes.

6. A motorcycle hitch device for attaching to a bottom surface of a rear fender of a motorcycle, said device comprising:

a pair of brackets each having a first portion and a second portion integrally connected to each other such that said first and second portions are in an angular relationship to each other at an angle generally between 90 degrees and 135 degrees, each of said brackets having a first side and a second side, each of said first and second sides being generally planar, each of said brackets having a plurality of apertures extending through said first and second sides, each of said first sides being attached to said bottom surface of said fender such that said second sides are facing each other, said first portions being orientated generally horizontal such that said second portions are extending downwardly away from the motorcycle;

a pair of saddles, each of said saddles being attached to one of said brackets, each of said saddles being generally adjacent to a free end of said second portions, each of said saddles comprising a tube having a pair of open ends, an axis of said tubes extending through said open ends being parallel with a respective second side of said brackets, said axis generally extending away from said second portion, each of said tubes having a hole therein traversing said axis;

a hitch portion comprising;
   a plate having a top side and a bottom side;
   a ball hitch being attached to said top side of said plate;
   a pair of mountings for removably coupling said plate to said saddles, each of said mountings comprising a bar attached to said bottom side of said plate, said bars being orientated parallel to each other and extending away from said plate, each of said bars having a bend therein such that said bars extend upwardly and outwardly from said plate, each of said bars being extendable into one of said saddles such that an edge of said plate adjacent a wheel of the motorcycle is positioned in spaced relationship to outwardly facing edges of said bars when said bars are positioned in said saddles for preventing contact between said edge of said plate adjacent the wheel of the motorcycle and the wheel of the motorcycle, said bends having an angle such that said plate is orientated generally horizontal parallel when said bars are extended into said saddle, each of said bars having an aperture therein positioned for alignment with one of said holes in said tubes; and each of a pair of pins being extendable through one of said holes in said tubes and one of said apertures in said bars for securing said bars to said saddles.

\* \* \* \* \*